Figure 5:
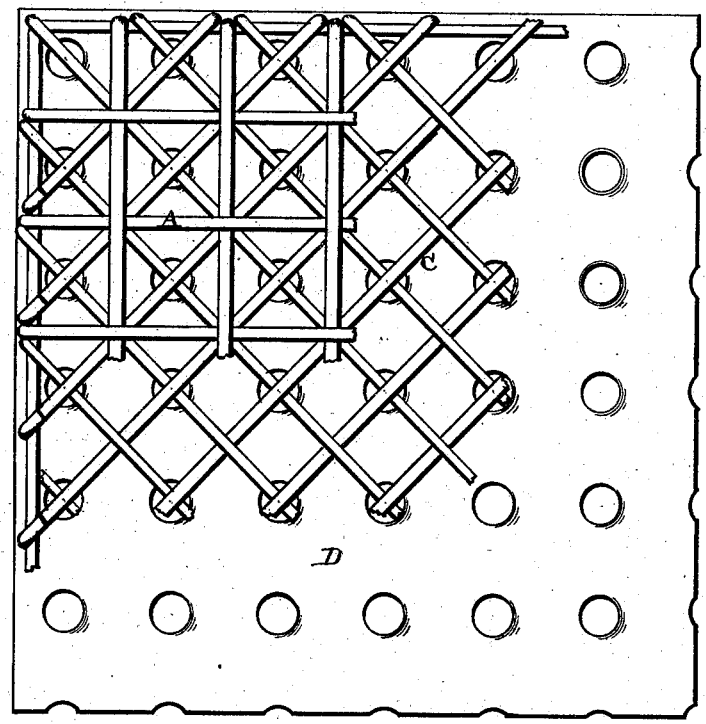

(No Model.) 2 Sheets—Sheet 1.
S. M. BROWN.
Cider and Wine Press.
No. 239,717. Patented April 5, 1881.
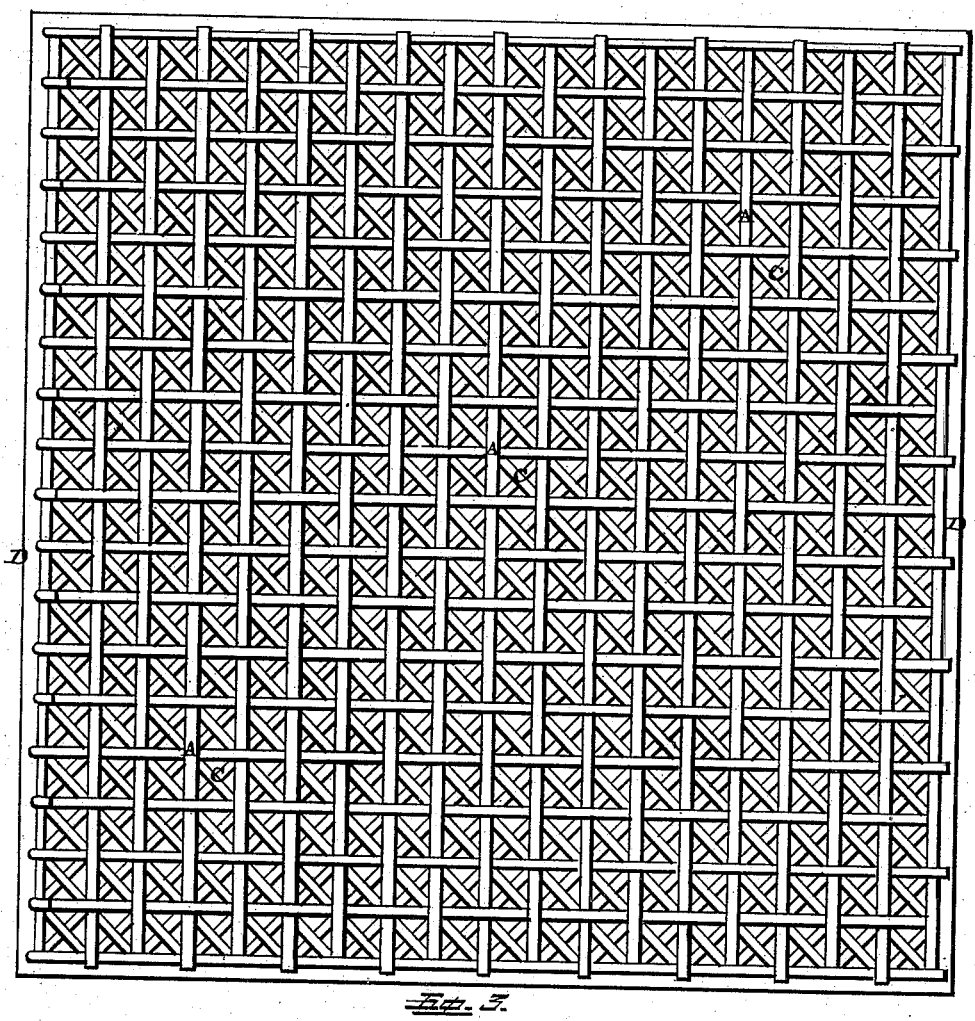
Witnesses:
Wm. W. Mortimer
Wm. H. Kern
Inventor:
S. M. Brown,
per
F. A. Lehmann,
Atty.
N. PETERS, PHOTO-LITHOGRAPHER, WASHINGTON, D. C.

(No Model.)  2 Sheets—Sheet 2.

S. M. BROWN.
Cider and Wine Press.

No. 239,717.  Patented April 5, 1881.

Witnesses.  Inventor.

UNITED STATES PATENT OFFICE.

SILAS M. BROWN, OF MARENGO, OHIO.

CIDER AND WINE PRESS.

SPECIFICATION forming part of Letters Patent No. 239,717, dated April 5, 1881.

Application filed January 27, 1881. (No model.)

*To all whom it may concern:*

Be it known that I, SILAS M. BROWN, of Marengo, in the county of Morrow and State of Ohio, have invented certain new and useful Improvements in Cider and Wine Presses; and I do hereby declare the following to be a full, clear, and exact description of the invention, such as will enable others skilled in the art to which it pertains to make and use it, reference being had to the accompanying drawings, which form part of this specification.

My invention relates to an improvement in cider and wine presses; and it consists in placing wire screens or nettings under the first clothful of pomace, and in between each succeeding layer, for the purpose of allowing the cider to be freely expressed from the pomace; and it further consists in combining with the wire screens or nettings a metallic plate which has a series of perforations punched through it, and which is placed underneath the nettings, so as to prevent the meshes of the bags or pressing-cloth from interfering with the free flow of the cider or wine while pressure is being applied to the pomace or grapes, all of which will be more fully described hereinafter.

The object of my invention is to dispense with the usual wooden racks, which are generally made of inch strips, and which are not only cumbrous and heavy to handle, but which interfere with the free flow of cider wherever the cloth comes in contact with one of the strips.

Figure 1 represents an edge view of the screen and the perforated plate. Figs. 2 and 5 are plan views of the two screens looped together, so that they can be opened and closed at the will of the operator. Fig. 3 is a vertical section of the perforated plate. Fig. 4 is a similar view of both screens and plate.

A represents a screen or sieve, made of wire, willow, or any other suitable material, and of any suitable thickness, and which may have the wires arranged at a suitable distance apart, so as to have the meshes of any desired size. Where the pomace has not been ground very fine, a single one of these wire screens used in connection with the perforated metallic plate will be sufficient; but where the pomace has been finely ground the two screens are preferable. The second screen, C, instead of having its meshes run in the same direction as the other screen, I, will have them made diagonally thereto, so as to form a greater distance between the top cloth, which incloses the pomace, and the perforated metallic plate, which is placed under the two screens. These two screens will be looped together in any suitable manner, so that they can be freely opened outward for the purpose of knocking the pomace out from between the meshes. Underneath these screens, where they are placed between successive layers of pomace, will be placed a metallic plate, D, which has a large number of holes punched through it, and the metal around each one of these holes is left in a slightly-raised condition, as shown. These raised portions of the metal form sorts of channels or grooves, in which the cider or wine can freely escape.

Where the pomace is not very finely ground, the meshes of the cloth which incloses the pomace cannot be forced down through the meshes of the wire screen to any such great extent, and hence the cloth will not be so liable to stop up the screen and prevent further escape of the juice. Where the pomace is finely ground, the meshes of the cloth will be forced down through the screen, so as to rest upon the base upon which the wire screen is placed, and hence prevents the juice freely escaping. Where the two screens are used and their meshes are placed diagonally to each other, the meshes of the cloth will still be forced down through them and rest upon the perforated plate which is placed underneath the two screens; but as the metal of the plate is raised upward around each one of the holes, so as to form channels or grooves in the plate, the juice runs off through these channels and freely escapes.

While it is preferable to use the wire screens in connection with the perforated plate, yet the screens can be used by themselves, if so desired. This metallic plate will not be necessary under the bottom of layer of pomace, for the floor of the press is usually made so that the juice can freely escape.

Having thus described my invention, I claim—

1. The combination, in a wine or cider press, of two or more screens placed with the meshes at an angle to each other, with a perforated metallic plate, substantially as shown.

2. The combination, in a wine or cider press, of a perforated metallic plate, D, having the punched-up metal projecting above the holes, with one or more screens placed upon the plate, substantially as set forth.

In testimony that I claim the foregoing I have hereunto set my hand this 27th day of January, 1881.

SILAS M. BROWN.

Witnesses:
F. A. LEHMANN,
W. H. KERN.